(12) United States Patent
Parker (10) Patent No.: US 11,671,178 B2
(45) Date of Patent: *Jun. 6, 2023

(54) INTERMEDIATE FREQUENCY CALIBRATED OPTICAL MODULATORS

(71) Applicant: OpenLight Photonics, Inc., Goleta, CA (US)

(72) Inventor: John Parker, Goleta, CA (US)

(73) Assignee: OpenLight Photonics, Inc., Goleta, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/222,200

(22) Filed: Apr. 5, 2021

(65) Prior Publication Data
US 2022/0069917 A1 Mar. 3, 2022

Related U.S. Application Data

(63) Continuation of application No. 17/001,951, filed on Aug. 25, 2020, now Pat. No. 10,998,979.

(51) Int. Cl.
*H04B 10/516* (2013.01)
*G02F 1/015* (2006.01)
*H04B 10/40* (2013.01)

(52) U.S. Cl.
CPC ......... *H04B 10/5161* (2013.01); *G02F 1/015* (2013.01); *H04B 10/40* (2013.01); *G02F 1/0155* (2021.01)

(58) Field of Classification Search
CPC .. C12Q 1/6804; C12Q 1/6806; C12Q 1/6809; C12Q 1/6844; C12Q 1/6883; C12Q 2600/154; G02F 1/015; G02F 1/0155; H04B 10/40; H04B 10/5161
See application file for complete search history.

(56) References Cited

U.S. PATENT DOCUMENTS 10,998,979 B1   5/2021  Parker
2002/0012495 A1*  1/2002  Sasai ............... H04B 10/25754
                                                           385/24

(Continued)

FOREIGN PATENT DOCUMENTS

CN   1599251 A    3/2005
CN   101278217 A  10/2008
CN   114124236 A  3/2022

OTHER PUBLICATIONS

U.S. Appl. No. 17/001,951, filed Aug. 25, 2020, Intermediate Frequency Calibrated Optical Modulators.

(Continued)

*Primary Examiner* — Omar S Ismail
(74) *Attorney, Agent, or Firm* — Schwegman Lundberg & Woessner, P.A.

(57) ABSTRACT

An optical modulator of an optical transceiver can be calibrated using intermediate frequency (IF) signals to generate accurate crossing point values (e.g., DC bias). A photodiode can measure output from the optical modulator at intermediate and high-speed frequencies to generate crossing point values that avoid crossing point errors. A target crossing point can be selected at any value (e.g., 40%, 50%) and bias values can be generated from IF signals and then stored in a lookup date for setting the modulator bias during operation.

20 Claims, 7 Drawing Sheets

(56) References Cited

U.S. PATENT DOCUMENTS

| | | | | |
|---|---|---|---|---|
| 2004/0033004 | A1* | 2/2004 | Welch | G02B 6/12033 385/14 |
| 2008/0101795 | A1* | 5/2008 | Schulz | H04B 10/0795 398/25 |
| 2008/0138088 | A1* | 6/2008 | Welch | H04B 10/506 398/183 |
| 2009/0208225 | A1* | 8/2009 | Daghighian | G02F 1/0136 398/184 |
| 2010/0247105 | A1* | 9/2010 | Yu | H04B 10/25759 398/116 |
| 2014/0147119 | A1* | 5/2014 | Watanabe | H04B 10/516 398/187 |
| 2014/0205277 | A1* | 7/2014 | Kasai | H04B 10/564 398/115 |
| 2015/0207567 | A1* | 7/2015 | Bogoni | H04B 10/2575 398/115 |
| 2016/0087747 | A1* | 3/2016 | Way | H04J 14/0221 398/81 |
| 2017/0003524 | A1* | 1/2017 | Schaefer | H04B 10/2575 |
| 2018/0083708 | A1* | 3/2018 | Schaefer | H04B 10/90 |
| 2019/0011558 | A1* | 1/2019 | Crouch | G01S 7/4866 |

OTHER PUBLICATIONS

"U.S. Appl. No. 17/001,951, Non Final Office Action dated Nov. 12, 2020", 17 pgs.

"U.S. Appl. No. 17/001,951, Notice of Allowance dated Feb. 24, 2021", 10 pgs.

"U.S. Appl. No. 17/001,951, Response filed Feb. 5, 2021 to Non Final Office Action dated Nov. 12, 2020", 8 pgs.

"European Application Serial No. 20207792.1, Extended European Search Report dated May 18, 2021", 7 pgs.

Bui, D T, "Improving the behavior of an electro-optic modulator by controlling its temperature", Advanced Technologies for Communications, (Oct. 12, 2009), 125-128.

Hyoung-Jun, Kim, "Multi-channel photonic frequency upconverter using a single electro-absorption modulator for generating WDM RoF signals", Microwave Symposium Digest (MTT), 2011 IEEE MTT-S International, IEEE, (Jun. 5, 2011), 1-4.

Pantjiaros, C, "FREEHANDS Fibre and Radio Enhanced IntEgration in Heterogeneous Access Networks for Delivery of Broadband Services; FSAN-Radio Integration aspects:", Internet Citation,, (May 1, 2003), 1-144.

"Chinese Application Serial No. 202011278708.5, Office Action dated Sep. 27, 2022", With English machine translation, 16 pgs.

* cited by examiner

INTERMEDIATE FREQUENCY CALIBRATED OPTICAL MODULATORS

PRIORITY

This application is a continuation of U.S. patent application Ser. No. 17/001,951, filed Aug. 25, 2020, which is incorporated by reference herein in its entirety.

TECHNICAL FIELD

The present disclosure generally relates to optical circuits, and more particularly to optical modulators.

BACKGROUND

Data can be imposed on a light stream using an optical modulator, such as an electro-absorption modulator (EAM). Generally, EAMs are fabricated with a variable bandgap, which can be narrowed to stop the flow of light (via application of an electric field) or relaxed to enable light to flow. EAMs can be used in high-speed modern optical devices that process data at high-speed data rates. Some parameters of EAMs can be difficult to correctly configure due to the high-speed of the modern devices.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

As discussed, EAM can modulate via application of an RF electric field to an optical carrier wave that allows some of the carrier wave peaks to pass (e.g., thereby corresponding to a high value, "1") and others blocked (e.g., corresponding to a low value, "0"). The DC bias of the EAM is important because it affects when the EAM is blocking/absorbing or transmitting photons (modulating or passing the carrier wave). Determining the correct DC bias is difficult because the correct DC bias changes as the EAM temperature changes. The DC bias affects the eye diagram crossing point, which is used to analyze a given signal's duty cycle issues and transmission quality. Generally, in calibration the goal is to find the correct DC bias to yield a target crossing point (e.g., 50%, 44%), where, as an example, 50% crossing point occurs about halfway horizontally in the middle of a given eye diagram and generally indicates a good duty cycle or quality signal modulation.

One issue for accurate calibration of DC voltage bias for target RF eye crossing value is that the eye crossing is affected by thermal and optical power effects. This means that it is inaccurate to calculate eye crossing from a DC measurement, as the thermal effects (e.g., from absorbed photocurrent current) during a DC sweep are different than when there is a RF high-speed data signal used (as in PAM4) with a fixed DC bias value. The key differences include: (1) that the DC sweep is slower than the thermal time constant, thus the device temperature is very different at the maximum and minimum voltages in the sweep. Whereas for a high frequency sweep that is faster than the thermal time constant, the device temperature is similar at maximum and minimum voltages in the sweep. Key difference: (2), at high frequency the charging and discharging of the capacitive active layer in the modulator dissipates significant power and creates self-heating. The solution is to have integrated characterization for the modulator at a frequency that is faster than the thermal time constant, but far slower than the data rate in order to save cost, size, and power consumption, and then account for the frequency dependent heating in the modulator active region.

Approaches for finding the voltage bias at the target crossing point include using a maximum optical amplitude modulation (OMA) bias (e.g., find the large-signal AC current output from the modulator), or find the maximum dO/dE bias (e.g., find the highest slope or maximum small-signal AC current output from the modulator). However, these approaches yield crossing point errors of up to 10% (e.g., 10% off the 50% crossing point), and the crossing point error changes as the RF data rate swing increases. Additionally, these approaches are increasingly inaccurate if the target crossing point is away from 50% (e.g., a 44% target crossing point for PAM4 to increase OMA with minor distortion to the eye, a 62% target crossing point). Furthermore, the crossing points will change for different modulator designs and, across different process/manufacturing variations, and temperature variations. One approach for measuring crossing point can be performed using a high-speed external oscilloscope; however, it is difficult to integrate or is not practical to integrate oscilloscope approaches in modern high-speed optical devices.

To this end, an optical transceiver modulator can be calibrated using an intermediate frequency that avoids temperature errors, where the RF crossing point is generated from the intermediate frequency for different temperatures. In some example embodiments, the EAM response is measured at the intermediate frequency (IF), which is faster than the thermal response but much slower than the full data rate (e.g., high-speed RF). In some example embodiments, the intermediate frequencies (e.g., 1 MHz-500 MHz) are frequencies that avoid heating-based crossing point errors as compared to high-speed RF frequencies (e.g., above 10 GHz).

The IF measurement can be implemented by integrating an IF signal generator into the modulator driver (e.g., a high-speed DAC), and the EAM response is measured using an integrated ADC connected to a monitor photodiode that is capable of IF signal detection, where the monitor photodiode is located after the EAM on the transmit optical chain. By configuring the modulator and monitor photodiode for IF operation, measurement of the EAM response versus voltage bias that is thermally representative of high-speed operation can be performed and RF crossing points can be generated. Additional hardware around the monitor photodiode and ADC readout circuit including memory and microprocessor provide support for storing test waveforms or data eyes, and running analysis on these to extract eye parameters.

Additionally, the IF and high-speed RF based approach enable the optical device for calibration of any crossing point, not just 50%, which enables accurate calibration of different types of modulator designs and modulation formats.

An example method is as follows: (1) measure the crossing points for different bias values using an intermediate frequency, (2) generate heating offset from IF to RF, (3) calculate RF crossing points from the IF crossing points and the heating offset values, (4) store RF crossing points in a lookup table, (5) repeat RF crossing points to generate values for different temperatures, (6) during operation, read transceiver temperature and set the DC bias of the modulator based on the lookup table value.

In some example embodiments, to further mitigate errors due to IF heating (even though smaller than RF heating based errors), an IF eye scan based method can be performed as follows: (1) measure the IF eye using an eye scan (e.g., via an ADC, memory, and a microprocessor), (2) measure the IF crossing point directly from the IF eye scan data, (3) apply an adjustment from IF to RF (e.g., via heating offset values) crossing points, (4) repeat for different temperatures (5) during operation read transceiver temperature and set the DC bias based on the lookup table value.

Figure 1:
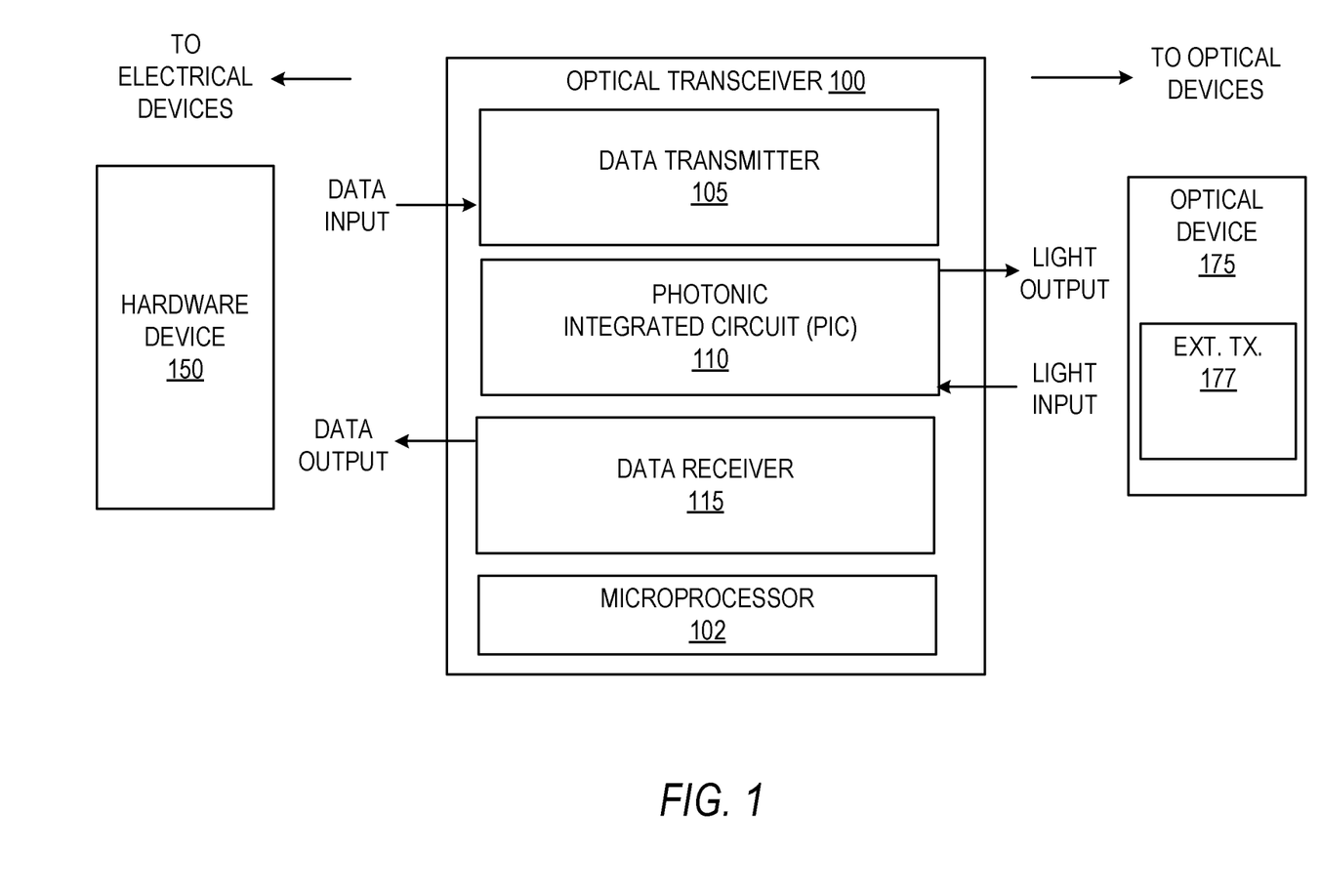
FIG. 1 is a block diagram illustrating an example optical transceiver for transmitting and receiving optical signals, according to some example embodiments.

FIG. 1 is a block diagram illustrating an example optical transceiver 100 for transmitting and receiving optical signals, according to some example embodiments. In the example illustrated in FIG. 1, the optical transceiver 100 processes data from electrical devices, such as electrical hardware device 150, converts the electrical data into optical data, and sends and receives the optical data with one or more optical devices, such as optical device 175. For example, the electrical hardware device 150 can be a host board that "hosts" the optical transceiver 100 as a pluggable device that sends and receives data to an optical switch network; where, for example, optical device 175 can be other components of an optical switch network (e.g., external transmitter 177). However, it is appreciated that the optical transceiver 100 can be implemented to interface with other types of electrical devices and optical devices. For instance, the optical transceiver 100 can be implemented as a single chip on a hybrid "motherboard" that uses an optical network (e.g., waveguides, fibers) as an optical bus to interconnect on-board electrical chips that process the data after it is converted from light into binary electrical data, according to some example embodiments.

In some example embodiments, the hardware device 150 includes an electrical interface for receiving and mating with an electrical interface of the optical transceiver 100. The optical transceiver 100 may be a removable front-end module that may be physically received by and removed from hardware device 150 operating as a backend module within a communication system or device. The optical transceiver 100 and the hardware device 150, for example, can be components of an optical communication device or system (e.g., a network device) such as a wavelength-division multiplexing (WDM) system or a parallel fiber system (e.g., parallel-single fiber (PSM)), according to some example embodiments.

In the example illustrated, the optical transceiver 100 includes a microprocessor 102 that controls electrical circuits (e.g., the data transmitter 105, the data receiver 115) and optical components such as the PIC 110.

The data transmitter 105 of the optical transceiver 100 can receive the electrical signals, which are then converted into optical signals via optical transmitter components (e.g., modulator, heater) of a photonic integrated circuit (PIC) 110. The PIC 110 can then output the optical signals via optical links, such as fiber or waveguides that interface with the PIC 110. The output light data can then be processed by other components (e.g., switches, endpoint servers, other embedded chips of a single embedded system), via a network such as a wide area network (WAN), optical switch network, optical waveguide network in an embedded system, and others.

In receiver mode, the PIC 110 (e.g., photodetector) can receive high data rate optical signals via one or more optical links to optical device 175. The optical signals are converted by the optical receiver components in the PIC 110 (e.g., SOA, photodiode), to convert from light into electrical signals for further processing by data receiver 115, such as demodulating the data into a lower data rate for output to other devices, such as the electrical hardware device 150. The modulation used by the optical transceiver 100 can include pulse amplitude modulation (e.g., 4-level PAM, such as "PAM4", PAM8, and so on), quadrature phase-shift keying (QPSK), binary phase-shift keying (BPSK), polarization-multiplexed BPSK, M-ary quadrature amplitude modulation (M-QAM), and others.

Figure 2:
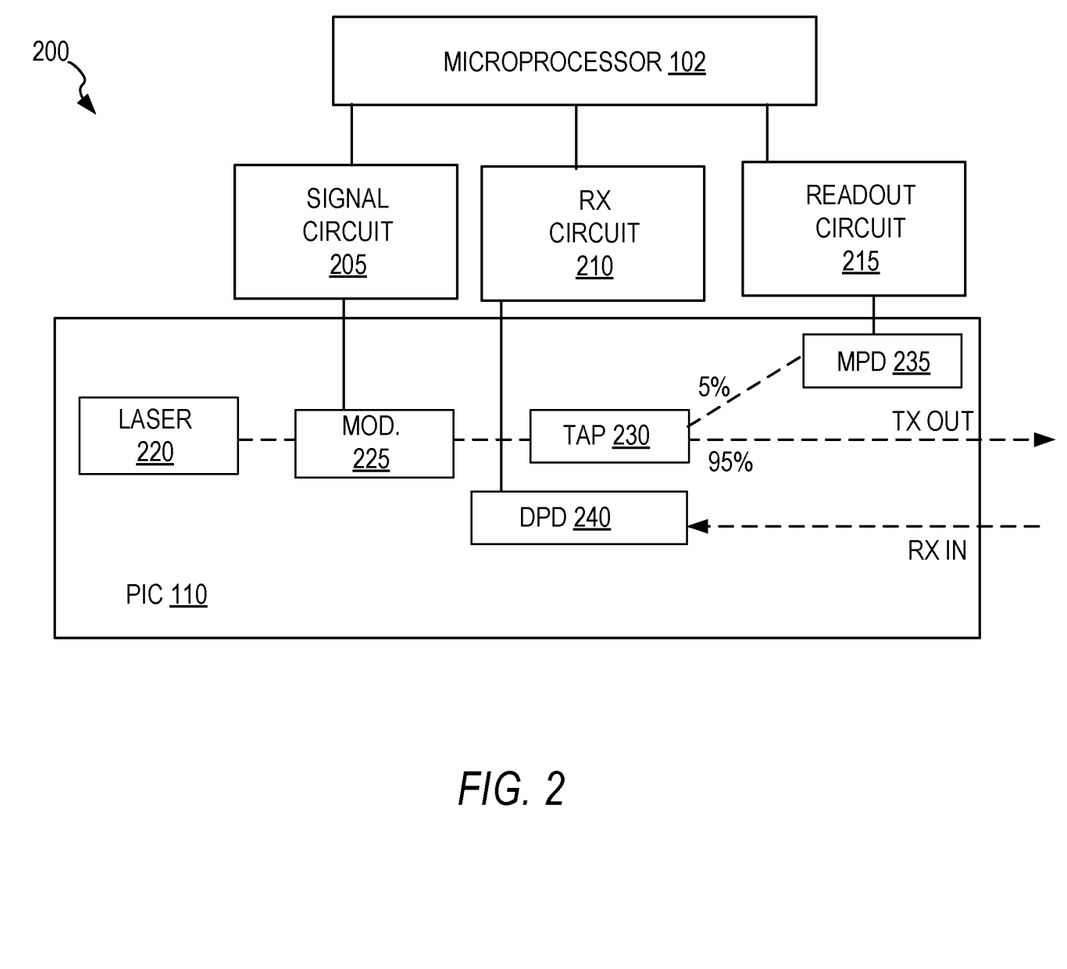
FIG. 2 shows an intermediate frequency (IF) modulator calibration architecture, according to some example embodiments.

FIG. 2 shows an IF modulator calibration architecture 200, according to some example embodiments. In FIG. 2, the microprocessor 102 including integrated memory interfaces with electrical circuits that include a signal circuit 205 (e.g., in data transmitter 105), a receiver circuit 210 (e.g., in data receiver 115), and a readout circuit 215 (e.g., in data transmitter 105). The electrical circuits control different optical components of the PIC 110. In some example embodiments, the signal circuit includes a signal generator that is configured to generate both IF (e.g., 1 MHz to 500

MHz) and high-speed RF signals (e.g., >10 GHz square wave or a pseudorandom binary sequence (PRBS) which is typically included to test link bit-error rate). In particular, the signal generated is capable of generating high-speed RF data signals (e.g., 50 GHz) and applying the high-speed signal to the modulator 225 to modulator light from the light source 220. The signal circuit 205 is further configured with an intermediate frequency signal generator to generate an intermediate frequency signal (e.g., 50 MHz), which is then applied to the modulator 225 via the modulator driver in the signal circuit 205. In some example embodiments, the IF signal has the same or similar amplitude or magnitude as the RF signal used to generate the crossing points (e.g., both set anywhere within 1-2Vpp, IF amplitude within 20% of RF amplitude, IF amplitude within 40% of RF amplitude). In some example embodiments, the IF signal implements a small dither in amplitude, e.g., 0.05-0.1 Vpp.

The receiver circuit 210 is a portion of the data receiver 115 and can include different components (e.g., amplifier, equalizer, high-speed ADC) to process received light that is detected by a high-speed data photodiode 240. The readout circuit 215 includes an ADC circuit to receive readout values generated from the monitor photodiode 235, which receives a portion of the light from the modulator 225 via an optical tap 230. For example, the tap 230 can direct a fraction of the light towards the monitor photodiode 235 for generation of IF and RF values to identify a target DC bias that yields a target crossing point (e.g., 50%, 40%). In some example embodiments, the readout circuit 215 includes an IF eye scan circuit that generates an IF eye pattern to determine one or more crossing points, as discussed in further detail with reference to FIG. 6 below.

Figure 3:
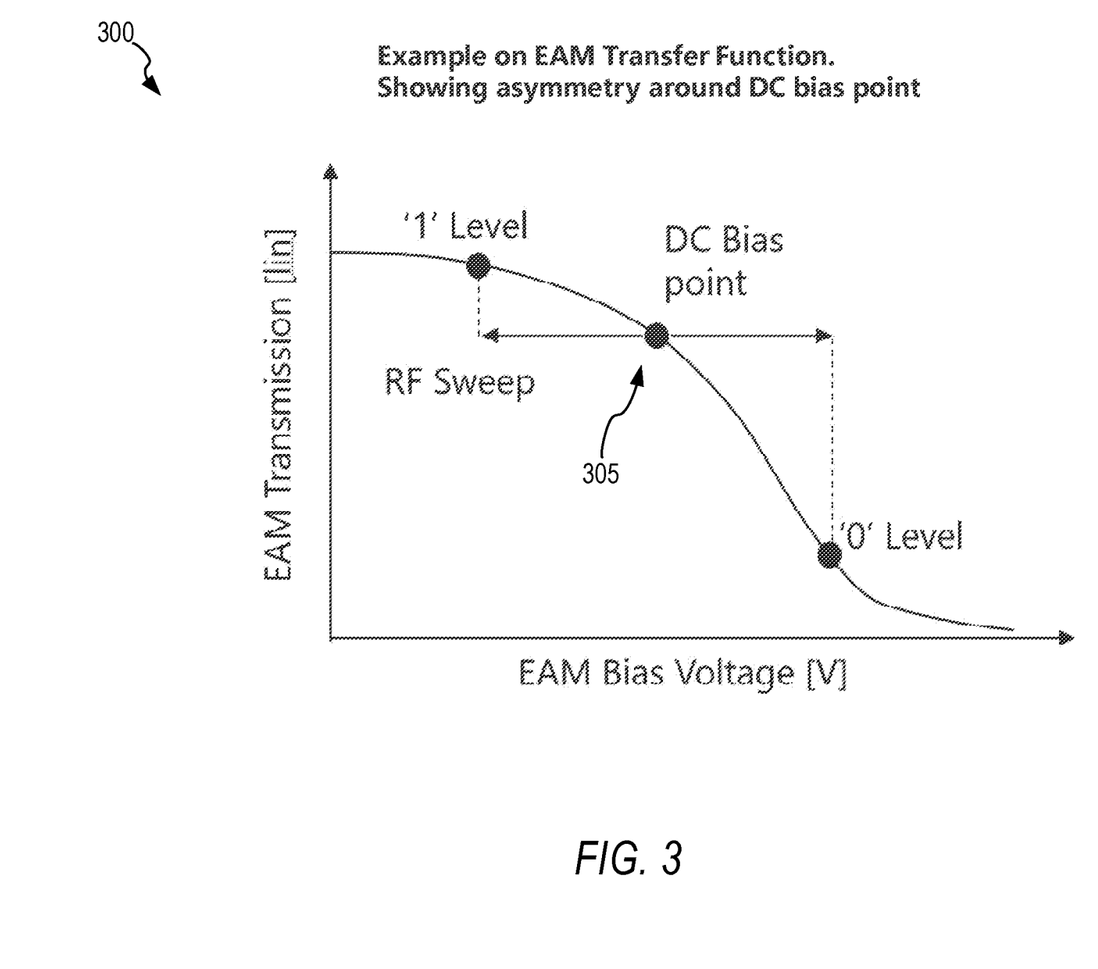
FIG. 3 shows an example transfer function diagram, according to some example embodiments.

FIG. 3 shows an example transfer function diagram 300, according to some example embodiments. The diagram 300 displays a response of an EAM provided different bias voltages. By identifying a DC bias point 305 near the middle of the on level ("1") and off level ("0") the modulator can be configured with a DC bias that yields a satisfactory eye crossing point, as shown in FIG. 4.

Figure 4:
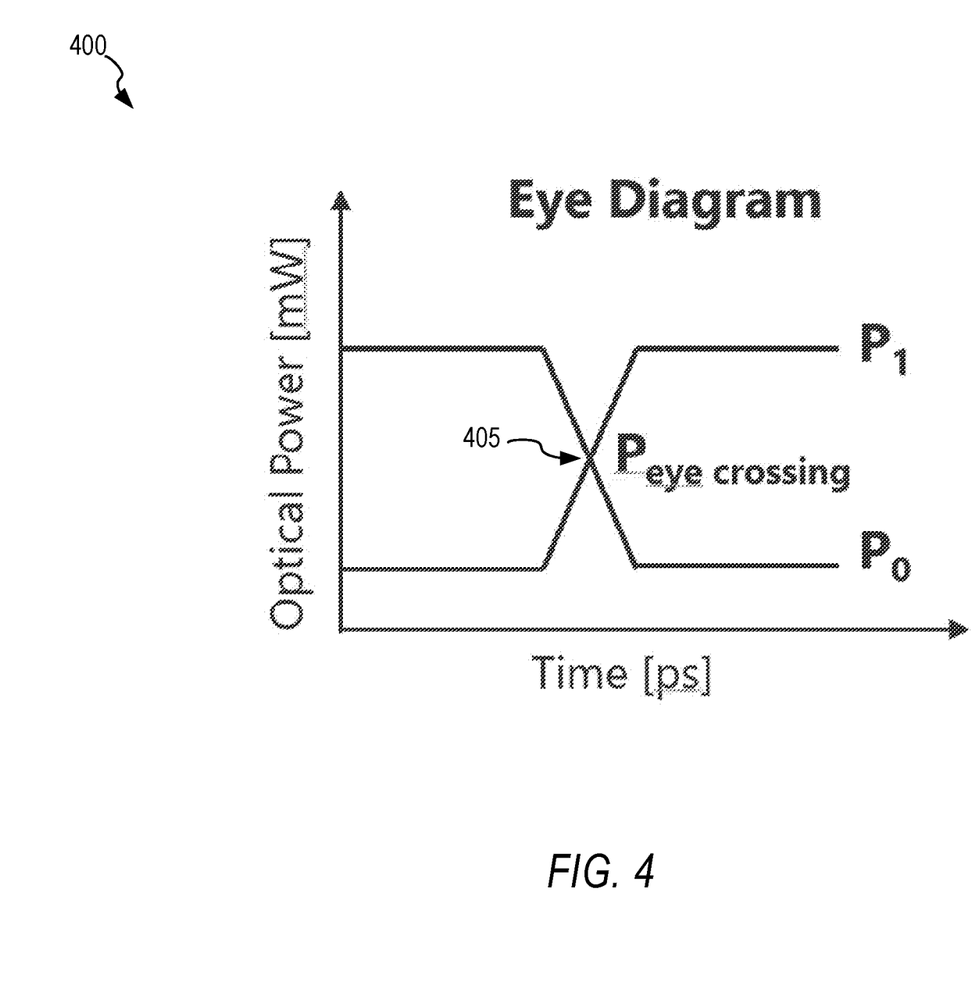
FIG. 4 shows an eye diagram, according to some example embodiments.

FIG. 4 shows an eye diagram 400, according to some example embodiments. In FIG. 4, only two signals are shown: $P_0$ and $P_1$ for explanatory purposes; however, it is appreciated that the additional curves can be included (e.g., PAM4, or PAM16). Generally, the eye crossing point 405 ($P_{eye\ crossing}$) is a point at which the levels change values (e.g., from high to low, or vice versa). Preferably, the eye openings are kept well defined, equal spaced, which can be set by ensuring the crossing point is at about 50% between the high state and the low state. However, as discussed, determining a DC bias for the modulator that yields a target crossing point can be difficult: the heating from a DC sweep does not simulate the heat of operational high-speed data (e.g., 50 GHz), and existing methods for calibration using high-speed RF exhibit bias voltages that are up to or over 10% away from the target crossing point.

To this end, the IF crossing point can be generated using a more efficient approach that avoids RF heating measurement errors because the measurements are IF based (e.g., DC, AC measurements) and the only high-speed RF measurements are averages (e.g., DC current from photodiode). For example, a 50 MHz IF square-wave has 1000× lower RF heating than a 50 GHz RF square-wave. The IF signal also requires much simpler circuits to read resulting in lower power consumption, chip area, and cost. In some implementations, the IF signal crossing point can be measured using an IF eye scan feature built into the monitor photodiode readout circuit, which captures the full time trace of the IF signal in memory, and then calculates the cross point using the microprocessor. However, simpler IF readout circuits which measure only AC and DC electrical current can reduce power consumption, chip area, and cost, as described in the following section.

In some example embodiments, the IF crossing point is generated using the equation below, where the inputs are the AC electrical current after the modulator ($I_{AC,\ IF\ Mod}$), the DC electrical current during IF modulation ($I_{DC,\ IF\ Mod}$), and the DC electrical current without modulation ($I_{DC,\ No\ Mod}$), where R is response and P is power.

$$I_{DC,No\ Mod} = RP_{ave,No\ Mod}$$

$$I_{DC,IF\ Mod} = RP_{ave,IF\ Mod} = R\frac{P_1 + P_0}{2}$$

$$I_{AC,IF\ Mod} = RP_{OMA} = R(P_1 - P_0)$$

$$IF\ \text{Crossing Point}(V_{DC\ Bias}) =$$

$$\frac{I_{DC,No\ Mod}(V_{DC\ Bias}) - I_{DC,IF\ Mod}(V_{DC\ Bias})}{I_{AC,IF\ Mod}(V_{DC\ Bias})} + \frac{1}{2}$$

Once the IF crossing point is measured, the RF crossing points are then generated. To calculate the RF heating, the DC photocurrent at the data frequency (high-speed RF) and at the intermediate frequency (IF) is measured. The bias voltage increase required to shift the IF DC photocurrent to the RF DC photocurrent is due to the RF heating, and this is used to calculate the RF crossing point:

$$V_{offset\ IF\ to\ RF} = \left|(I_{DC,RF\ Mod} - I_{DC,IF\ Mod})\frac{dV_{DC,IF\ Mod}}{dI_{DC,IF\ Mod}}\right|$$

Where $I_{DC,RF\ Mod}$ and $I_{DC,IF\ Mod}$ are measured at the same DC bias voltage with RF and IF modulation applied. Further, the $dV_{DC,IF\ Mod}/dI_{DC,IF\ Mod}$ is the rate of change in $I_{DC,IF\ Mod}$ for a change in DC bias voltage. The RF crossing point (for a given bias) can then be generated using:

$$RF\ \text{Crossing Point}(V_{DC\ Bias}) = \frac{I_{DC,No\ Mod}(V_{DC\ Bias} + V_{offset\ IF\ to\ RF}) - I_{DC,Mod}(V_{DC\ Bias} + V_{offset\ IF\ to\ RF})}{I_{AC,IF\ Mod}(V_{DC\ Bias} + V_{offset\ IF\ to\ RF})} + \frac{1}{2}$$

Figure 5:
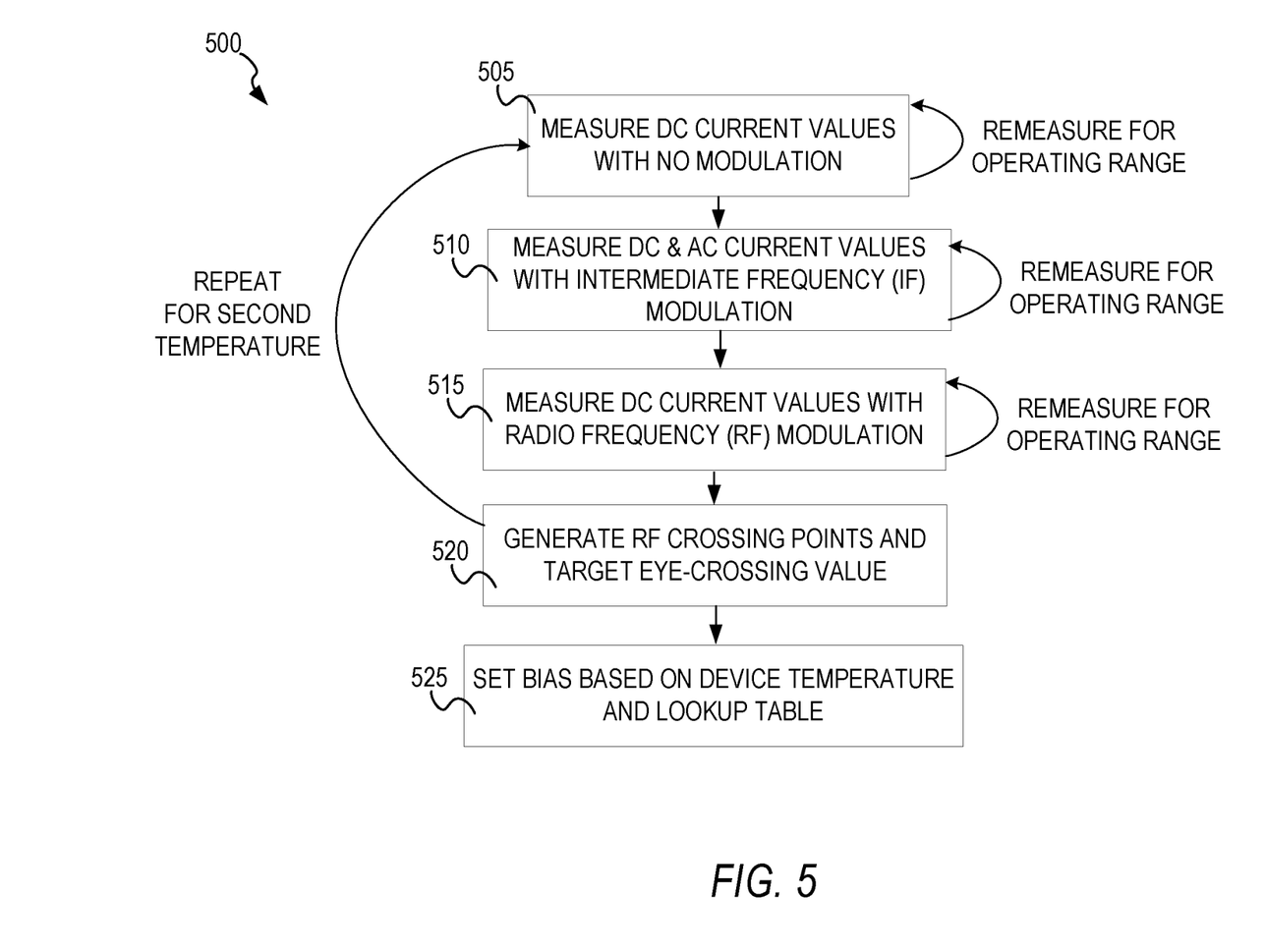
FIG. 5 shows a flow diagram of a method for intermediate frequency-based calibration of an optical modulator, according to some example embodiments.

FIG. 5 shows a flow diagram of a method 500 for intermediate frequency-based calibration of an optical modulator, according to some example embodiments. Although PAM4 and EAMs are discussed as an example, it is appreciated that the intermediate frequency approach can be implemented to other modulation formats and other types of light absorption modulators where high-speed data rates cause crossing point calibration inaccuracies due to heat.

At operation 505, DC current values with no modulation is measured. For example, a laser is set at fixed mission mode power, and the DC voltage bias on the modulator is set to its lowest value (e.g., reverse biased at −1V). Further, the modulator is muted, and no intermediate frequency or radio frequency signal is applied to the modulator. After the laser and bias are set, the DC electrical current from the monitor photodiode that is placed after the modulator is measured to generate a DC electrical current value (e.g., for NRZ, or outer eyes). The operation 505 can then be repeated for different DC voltage biases to cover the operating range of the modulator. For example, the DC voltage bias on the modulator can be increased to a different value, and the DC electrical current from the monitor photodiode is then remeasured to generate the DC electrical current value at the increased voltage bias. Additional voltage biases can be measured in a similar manner at operation 505 until the full operating range is covered (e.g., from −1V to −5V).

At operation 510, DC and AC current values for intermediate frequency modulation are measured (e.g., for NRZ, or outer eye crossing point). For example, the DC voltage bias on the modulator is set to its lowest value (e.g., −1V) and an intermediate square wave signal (e.g., 50 MHz) is applied to the modulator driver to modulate the optical modulator. With the intermediate frequency applied, DC electrical current and AC electrical current are measured using the monitor photodiode placed after the modulator. The operation 510 can be repeated for different DC and AC values for different operating ranges. For example, the DC voltage bias on the modulator is increased to a new value, the intermediate frequency is reapplied to the modulator, and the DC electrical current and the AC electrical current is remeasured from the monitor photodiode at the new DC voltage bias level. Additional levels of voltage bias may be applied and then AC and DC values measured until the entire operating range is covered.

At operation 515, DC electrical current is measured while using radio frequency modulation (e.g., measured for NRZ, outer eye crossing). For example, the DC voltage bias of the optical modulator is set to its lowest value and the modulator driver is configured to apply a high-speed radiofrequency square wave signal (50 GHz) to the modulator. With the operational data frequency rate (RF) applied to the modulator, the DC electrical current on the monitor photodiode placed after the modulator is then measured. In some example embodiments, the operation 515 is looped to generate additional values for the full operating range. For example, the DC voltage bias is increased, the high-speed radio frequency wave is applied, and the DC current from the monitor photodiode is remeasured at the new bias value.

At operation 520, the RF crossing points, and the target eye crossing values are generated (e.g., for NRZ crossing point, outer eye crossing point). For example, at operation 520, the RF crossing point for every DC bias on the modulator is calculated using the radiofrequency and intermediate frequency equations discussed above. Further, the DC voltage bias that is closest to the target eye crossing value (e.g., 50%) is calculated. For example, from the generated crossing points at the different DC biases, the DC voltage bias that is closest to the target value (e.g., closest to the 50% crossing point) is selected. In some example embodiments, the RF calculations and intermediate frequency calculations are remeasured and recalculated at a different temperature. For example, the temperature of the optical transceiver is increased thereby also increasing the temperature of the optical modulator. While the optical transceiver is at that the second temperature, new RF crossing point values can be calculated and the DC voltage bias that is closest to the target eye crossing value at the second temperature is selected for the DC bias crossing point. Additionally, using the first and second temperature data, additional DC voltage biases for the target eye crossing values can be created by interpolating between the data for the two temperature points, and then extrapolating beyond the two temperature points to generate additional DC voltage biases across a larger range of operational temperatures. In some example embodiments, the target crossing point data generated for the different measurements and the different temperatures are stored on a lookup table in memory of the device for later use in setting the modulator bias at the crossing point.

At operation 525, during operation of the optical transceiver, the DC bias of the optical modulator is set based on the device temperature and based on the lookup table value corresponding to the temperature. For example, during operation of the optical transceiver, the optical transceiver temperature is identified (via an integrated temperature sensor on the optical transceiver), and further, the lookup table is referenced for the corresponding modulator DC bias value that is closest to the target eye crossing value from the lookup table.

Figure 6:
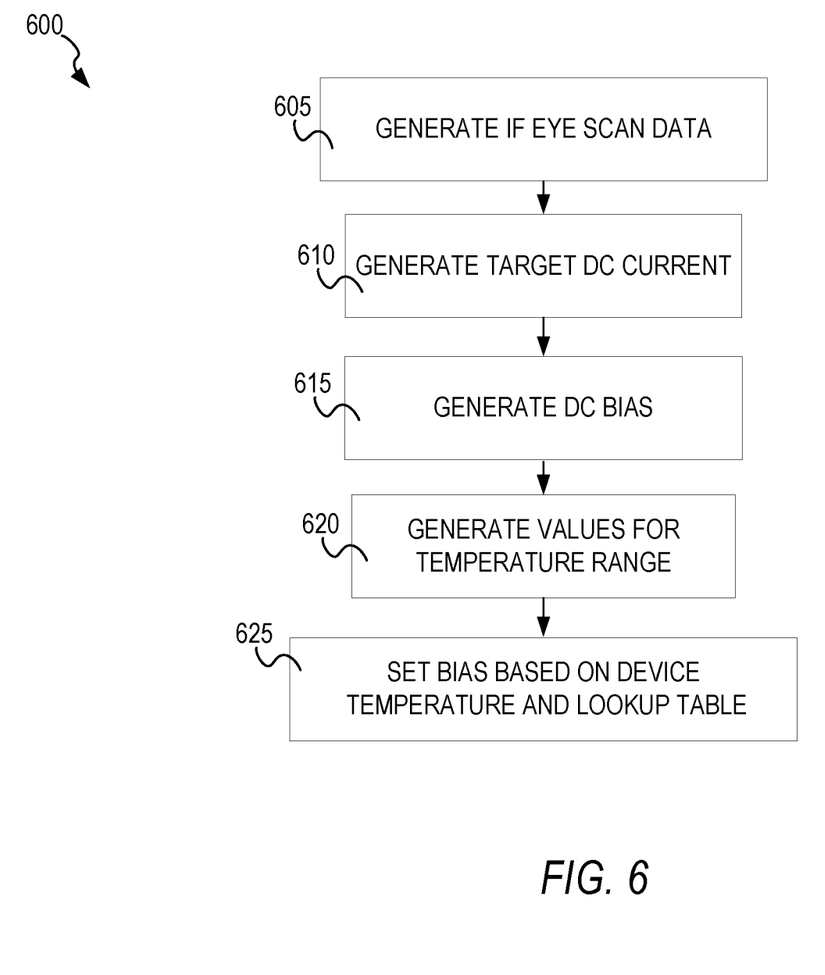
FIG. 6 shows a flow diagram of a method for intermediate frequency calibration using an IF eye scan, according to some example embodiments.

FIG. 6 shows a flow diagram of an example method 600 for calibration of an optical modulator using intermediate frequency eye scan data, according to some example embodiments. In the approach of FIG. 6, an intermediate frequency eye scan in readout circuit 215 is used to generate an eye pattern from which IF and RF crossing points can be generated, according to some example embodiments. At operation 605, intermediate frequency eye scan data is generated. For example, IF crossing point calibration operations with IF eye scans are performed using the PAM-4 outer eye only (0-level and 3-level) using an IF eye scan in readout circuit 215. In calibration operations, the modulator is set to the target crossing value for IF modulation (e.g., $V_{DC\ Bias\ at\ Crossing\ Target}$) and the modulator driver in the signal circuit 205 is turned on with an IF PAM-4 test pattern. The eyes of the IF PAM4 wave are then measured using the IF eye scan module (e.g., high-speed ADC with memory to store the test pattern output, and microprocessor to analyze data) and the PAM eye quality metric data is calculated (e.g., ratio-level-mismatch (RLM), inner eye OMAs) and only the eye quality calculations are then stored. The combinations of 1-level and 2-level voltage offsets are then stepped through while keeping the outer swing fixed, and then remeasuring after each step. At each step, the calculated eye quality is stored in a table for reference.

At operation 610, a target DC current value is generated. For example, the eye quality closest to target based on RLM, inner OMA, and crossing point targets is calculated, and then further used to set the 1-level and 2-level settings for the PAM-4 test pattern. Then the target DC current is determined by measuring the DC electrical current on the monitor photodiode placed after the modulator is measured while the IF PAM-4 test pattern is applied.

At operation 615, the DC bias value is determined using the target DC current value. For example, the modulator driver is provided an RF PAM-4 test pattern and with the same outer swing and 1-level and 2-level settings as before. Then step through $V_{DC\ Bias}$ and record the DC electrical current on the monitor photodiode placed after modulator while the RF PAM-4 test pattern is applied. The $V_{DC\ Bias}$ is then determined by identifying the $V_{DC\ Bias}$ that is closest to the target DC current of operation 610.

At operation 620, additional modulator values for a full operating temperature range are generated. After performing the previous operations at a first temperature, the first transceiver temperature, DC bias, 1-level, and 2-level values are then saved to integrated memory as a lookup table. Next, at a second temperature, the above operations are repeated to generate DC bias, 1-level, and 2-level values which are stored with the second temperature in the lookup table. Further, additional values for different temperatures can then be generated by interpolating the data between the first and second temperatures, and further by using the data from the two temperatures points to extrapolate to additional temperatures above and below the first and second temperatures. Once the values are generated for the full range of temperatures, the data is stored to memory in the lookup table for reference during operation.

At operation 625, the bias is set based on stored lookup table data. For example, during operation, the transceiver temperature is determined and then the modulator DC bias is set from the lookup table based on the current temperature.

Figure 7:
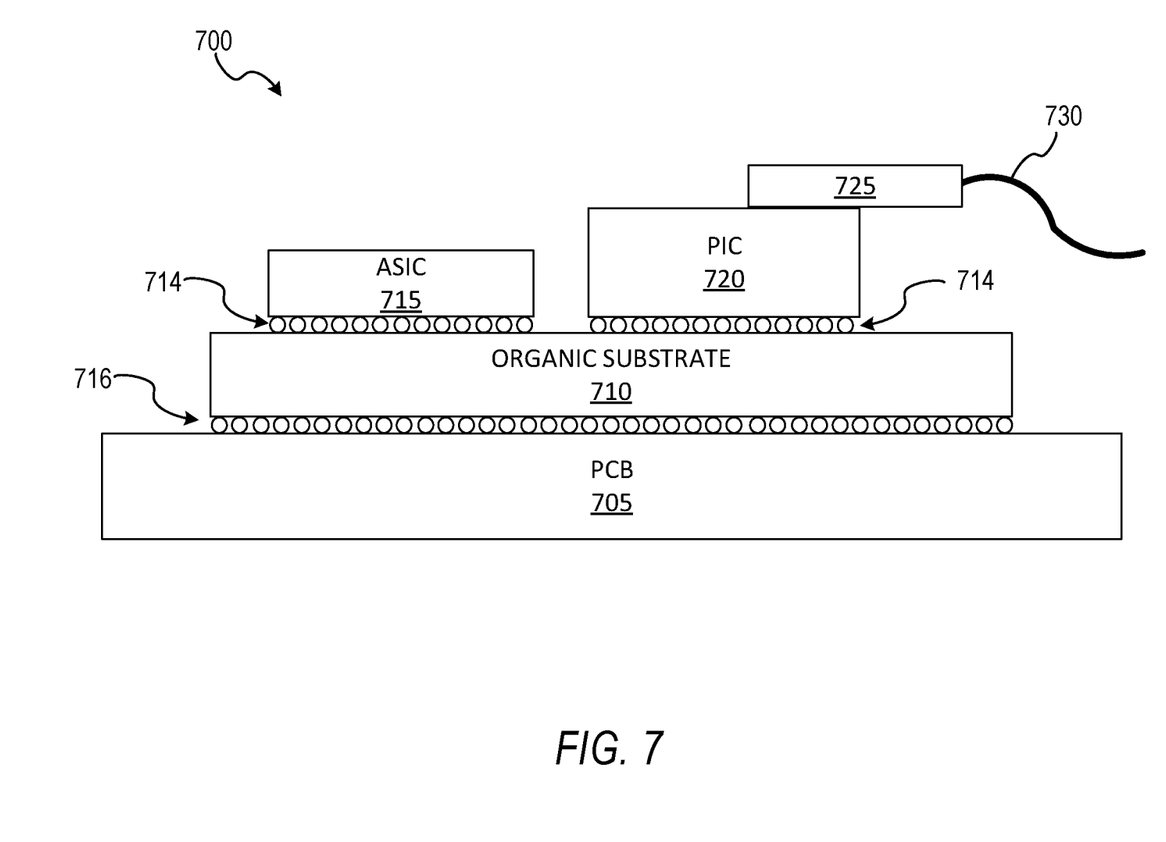
FIG. 7 is an illustration of an optical-electrical device including one or more optical devices, according to an embodiment of the disclosure.

FIG. 7 is an illustration of an optical-electrical device 700 including one or more optical devices, according to an embodiment of the disclosure. In this embodiment, the optical-electrical device 700 is a multi-structure chip package that includes a printed circuit board (PCB) substrate 705, organic substrate 710, application specific integrated circuit (ASIC) 715, and photonic integrated circuit (PIC) 720. In this embodiment, the PIC 720 may include one or more optical structures described above (e.g., PIC 110).

In some example embodiments, the PIC 720 includes silicon on insulator (SOI) or silicon-based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material. III-V semiconductors have elements that are found in group III and group V of the periodic table (e.g., Indium Gallium Arsenide Phosphide (InGaAsP), Gallium Indium Arsenide Nitride (GainAsN)). The carrier dispersion effects of III-V-based materials may be significantly higher than in silicon-based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as iron, cobalt, or yttrium iron garnet (YIG). Further, in some example embodiments, crystal substrate materials provide heterogeneous PICs with a high electro-mechanical coupling, linear electro optic coefficient, low transmission loss, and stable physical and chemical properties. Said crystal substrate materials may comprise, for example, lithium niobate (LiNbO3) or lithium tantalate (LiTaO3). In the example illustrated, the PIC 720 exchanges light with fiber 730 via prism 725; said prism 725 is a misalignment-tolerant device used to couple an optical mode to one or more single-mode optical fibers (e.g., to transmit light to and from an optical network), according to some example embodiments.

In some example embodiments, the optical devices of PIC 720 are controlled, at least in part, by control circuitry included in ASIC 715. Both ASIC 715 and PIC 720 are shown to be disposed on copper pillars 714, which are used for communicatively coupling the ICs via organic substrate 710. PCB 705 is coupled to organic substrate 710 via ball grid array (BGA) interconnect 716, and may be used to interconnect the organic substrate 710 (and thus, ASIC 715 and PIC 720) to other components of optical-electrical device 700 not shown, such as interconnection modules, power supplies, and so forth.

The following are example embodiments:

Example 1. A method for processing light using an optical transceiver, the method comprising: receiving, by an electro-absorption modulator (EAM) of an optical transceiver, light generated from a light source; generating modulated light by modulating the light at a high-speed radio frequency (RF) data rate using the EAM, the EAM having a crossing point set according to an intermediate frequency (IF) data rate that is lower than the high-speed RF data rate; and transmitting the modulated light using the optical transceiver.

Example 2. The method of example 1, wherein the IF data rate is a frequency at least an order of magnitude less than the RF data rate.

Example 3. The method of example 1 or 2, wherein the RF data rate is a high-speed frequency that causes heating inaccuracies in measurement of the crossing point of the EAM, wherein the IF data rate is from a frequency range that is low enough to avoid heating inaccuracies in measurement of the crossing point of the EAM and high enough to be above a thermal response time of the EAM to avoid heating transient effects during modulation.

Example 4. The method of any of examples 1-3, wherein the optical transceiver comprises a signal generator that is configured to provide IF signal and high-speed RF signal to the EAM.

Example 5. The method of any of examples 1-4, wherein the crossing point is set from a bias value stored in a lookup table on the optical transceiver.

Example 6. The method of any of examples 1-5, wherein the bias value is generated by applying the IF data rate at an amplitude similar to the RF data rate to the EAM to determine the crossing point.

Example 7. The method of any of examples 1-6, wherein the light source is an embedded light source that is integrated in the optical transceiver.

Example 8. The method of any of examples 1-7, wherein the embedded light source comprises a III-V layer to generate light.

Example 9. The method of any of examples 1-8, wherein the optical transceiver comprises a monitor photodiode to measure output from the EAM and an IF eye scan circuit to generate eye scan data from output of the monitor photodiode.

Example 10. The method of any of examples 1-9, wherein the modulated light is in pulse-amplitude modulation (PAM) format.

Example 11. The method of any of examples 1-10, wherein the PAM format is PAM-4 and the modulated light comprises four optical levels.

Example 12. An optical transceiver comprising: an input light pathway to receive light generated from a light source; an electro-absorption modulator (EAM) to generate modulated light by modulating the light at a high-speed radio frequency (RF) data rate, the EAM having a crossing point set according to an intermediate frequency (IF) data rate that is lower than the high-speed RF data rate; and an output light pathway to transmit the modulated light.

Example 13. The optical transceiver of example 12, wherein the IF data rate is a frequency at least an order of magnitude less than the RF data rate.

Example 14. The optical transceiver of examples 12 or 13, wherein the RF data rate is a high-speed frequency that causes heating inaccuracies in measurement of the crossing point of the EAM, wherein the IF data rate is from a frequency range that is low enough to avoid heating inaccuracies in measurement of the crossing point of the EAM and high enough to be above a thermal response time of the EAM to avoid heating transient effects during modulation.

Example 15. The optical transceiver of any of examples 12-14, wherein the optical transceiver comprises a signal generator that is configured to provide IF signal and high-speed RF signal to the EAM.

Example 16. The optical transceiver of any of examples 12-15, wherein the crossing point is set from a bias value stored in a lookup table on the optical transceiver.

Example 17. The optical transceiver of any of examples 12-16, wherein the bias value is generated by applying the IF data rate at an amplitude similar to the RF data rate to the EAM to determine the crossing point.

Example 18. The optical transceiver of any of examples 12-17, wherein the light source is an embedded light source that is integrated in the optical transceiver.

Example 19. The optical transceiver of any of examples 12-18, wherein the optical transceiver comprises a monitor photodiode to measure output from the EAM and an IF eye scan circuit to generate eye scan data from output of the monitor photodiode.

Example 20. The optical transceiver of any of examples 12-19, wherein the modulated light is in pulse-amplitude modulation (PAM) format.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. A method for processing light using an optical transceiver, the method comprising
   receiving, by a modulator of the optical transceiver, light generated from a light source;
   generating modulated light by modulating the light at a high frequency data rate using the modulator, the modulator having a crossing point set according to a lower frequency data rate that is lower than the high frequency data rate; and
   transmitting the modulated light using the optical transceiver.

2. The method of claim 1, wherein the high frequency data rate causes heating inaccuracy in measurement of the crossing point of the modulator.

3. The method of claim 2, wherein the lower frequency data rate is a frequency that is low enough to avoid heating inaccuracy in measurement of the crossing point and high enough to be above a thermal response time of the modulator to avoid heating transient effects during modulation.

4. The method of claim 1, wherein the lower frequency data rate is a frequency at least an order of magnitude less than the high frequency data rate.

5. The method of claim 1, wherein the light source is an external light source that is external to the optical transceiver.

6. The method of claim 1, wherein the optical transceiver comprises a signal generator that is configured to provide the high frequency data rate and the lower frequency data rate.

7. The method of claim 1, wherein the crossing point is set from a bias value stored in a lookup table on the optical transceiver.

8. The method of claim 7, wherein the bias value is generated by applying the lower frequency data rate at an amplitude similar to the high frequency data rate to the modulator to determine the crossing point.

9. The method of claim 1, wherein the light source is an embedded light source that is integrated in the optical transceiver.

10. The method of claim 9, wherein the embedded light source comprises a III-V layer to generate light.

11. The method of claim 1, wherein the optical transceiver comprises a monitor photodiode to measure output from the modulator and an eye scan circuit to generate eye scan data from output of the monitor photodiode.

12. The method of claim 1, wherein the modulated light is in pulse-amplitude modulation (PAM) format.

13. The method of claim 12, wherein the PAM format is PAM-4 and the modulated light comprises four optical levels.

14. The method of claim 1, wherein the modulator is an electro-absorption modulator.

15. An optical transceiver comprising:
    an input light pathway to receive light generated from a light source;
    a modulator to generate modulated light by modulating the light at a high frequency data rate, the modulator having a crossing point set according to a lower frequency data rate that is lower than the high frequency data rate; and
    an output light pathway to transmit the modulated light.

16. The optical transceiver of claim 15, wherein the high frequency data rate causes heating inaccuracy in measurement of the crossing point of the modulator.

17. The optical transceiver of claim 16, wherein the lower frequency data rate is a frequency that is low enough to avoid heating inaccuracy in measurement of the crossing point and high enough to be above a thermal response time of the modulator to avoid heating transient effects during modulation.

18. The optical transceiver of claim 15, wherein the lower frequency data rate is a frequency at least an order of magnitude less than the high frequency data rate.

19. The optical transceiver of claim 15, wherein the light source is an external light source that is external to the optical transceiver.

20. The optical transceiver of claim 15, wherein the optical transceiver comprises a signal generator that is configured to provide the high frequency data rate and the lower frequency data rate.

* * * * *